(12) United States Patent
Yang

(10) Patent No.: US 10,908,290 B2
(45) Date of Patent: Feb. 2, 2021

(54) OPTICAL DISTANCE MEASURING METHOD AND OPTICAL DISTANCE MEASURING DEVICE

(71) Applicant: Shenzhen Goodix Technology Co., Ltd., Guangdong (CN)

(72) Inventor: Mengta Yang, Taipei (TW)

(73) Assignee: Shenzhen Goodix Technology Co., Ltd., Guangdong (CN)

( * ) Notice: Subject to any disclaimer, the term of this patent is extended or adjusted under 35 U.S.C. 154(b) by 366 days.

(21) Appl. No.: 15/974,705

(22) Filed: May 9, 2018

(65) Prior Publication Data

US 2019/0064359 A1 Feb. 28, 2019

Related U.S. Application Data

(63) Continuation of application No. PCT/CN2017/099408, filed on Aug. 29, 2017.

(51) Int. Cl.
*G01S 17/42* (2006.01)
*G01S 17/89* (2020.01)
(Continued)

(52) U.S. Cl.
CPC .......... *G01S 17/42* (2013.01); *G01B 11/2513* (2013.01); *G01S 7/4865* (2013.01);
(Continued)

(58) Field of Classification Search
CPC ........ G01S 17/42; G01S 7/4865; G01S 17/89; G01S 17/48; G01S 7/497; G01S 17/08; G01B 11/2513
(Continued)

(56) References Cited

U.S. PATENT DOCUMENTS 6,750,960 B2 6/2004 Bowers
9,377,533 B2 * 6/2016 Smits ............... G01S 17/42
(Continued)

FOREIGN PATENT DOCUMENTS

CN 1632463 A 6/2005
CN 101479567 A 7/2009
(Continued)

OTHER PUBLICATIONS

"Confirm" definition, Merriam-Webster, downloaded Jul. 5, 2020 from https://www.merriam-webster.com/dictionary/confirm, 8 pages. (Year: 2020).*
(Continued)

*Primary Examiner* — Daniel L Murphy
(74) *Attorney, Agent, or Firm* — Winston Hsu

(57) ABSTRACT

The present invention provides an optical distance measuring method, comprising confirming an expression of a first measured distance according to a plurality of first parameters; computing a time-of-flight (ToF) measured distance according to a time of flight; computing optimized values of the plurality of first parameters and an optimized value of a ToF error corresponding to the ToF measured distance according to the expression of the first measured distance and the ToF measured distance; and obtaining a depth image information according to the ToF measured distance, the optimized values of the plurality of first parameters and the optimized value of the ToF error; wherein the plurality of first parameters comprises an elevation angle and an Azimuth angle corresponding to the object reflecting point and a distance between the light emitting module and the light sensing module.

14 Claims, 4 Drawing Sheets

(51) Int. Cl.

| | |
|---|---|
| *G01S 7/486* | (2020.01) |
| *G01S 7/4865* | (2020.01) |
| *G01S 17/48* | (2006.01) |
| *G01B 11/25* | (2006.01) |
| *G01S 7/497* | (2006.01) |
| *G01S 17/08* | (2006.01) |

(52) U.S. Cl.
CPC .............. *G01S 7/497* (2013.01); *G01S 17/08* (2013.01); *G01S 17/48* (2013.01); *G01S 17/89* (2013.01)

(58) Field of Classification Search
USPC ........................................................ 356/5.01
See application file for complete search history.

(56) References Cited

U.S. PATENT DOCUMENTS

| | | | |
|---|---|---|---|
| 9,726,754 B2* | 8/2017 | Massanell | G01S 7/4972 |
| 2014/0211193 A1 | 7/2014 | Bloom | |
| 2015/0062558 A1 | 3/2015 | Koppal | |
| 2015/0292876 A1 | 10/2015 | Pettersson | |
| 2016/0123764 A1 | 5/2016 | Lee | |
| 2017/0068319 A1 | 3/2017 | Viswanathan | |
| 2019/0353767 A1* | 11/2019 | Eberspach | G01S 3/783 |

FOREIGN PATENT DOCUMENTS

| | | |
|---|---|---|
| CN | 101490579 A | 7/2009 |
| CN | 103090846 A | 5/2013 |
| CN | 104266605 A | 1/2015 |
| CN | 104280739 A | 1/2015 |
| CN | 104903677 A | 9/2015 |
| CN | 105572684 A | 5/2016 |
| CN | 106780618 A | 5/2017 |
| JP | 2013-104784 A | 5/2013 |
| KR | 10-2010-0036174 A | 4/2010 |
| TW | 201632912 A | 9/2016 |

OTHER PUBLICATIONS

"Formulate" definition, Merriam-Webster, downloaded Jul. 5, 2020 from https://www.merriam-webster.com/dictionary/formulate, 7 pages. (Year: 2020).*

Wang Zhenyu et al.; Calibration method and error analysis of laser triangulation measurement; Laser Technology, vol. 41, No. 4, p. 521-525, Jul. 2017.

Bo Jiang et al., Hierarchical self-assembly of triangular metal-lodendrimers into the ordered nanostructures, Elsevier, Chinese Chemical Letters 27, 2016, p. 607-612.

Zhao Jianlin et al., An Experimental Calibration Method for Laser Triangulation; <Journal of Northwestern Polytechnical University> vol. 16, No. 3, p. 387-390, Aug. 1998.

Moonwook Yu, 3D Sensing Technology for Gesture Recognition, Process Control Instrumentation Technology Magazine ,Jul. 2016, pp. 102-111.

* cited by examiner

OPTICAL DISTANCE MEASURING METHOD AND OPTICAL DISTANCE MEASURING DEVICE

CROSS REFERENCE TO RELATED APPLICATIONS

The present application is a continuation of international application No. PCT/CN2017/099408, filed on Aug. 29, 2017, which is incorporated herein by reference in its entirety.

FIELD OF THE INVENTION

The present application relates to an optical distance measuring method and an optical distance measuring device, and more particularly, to an optical distance measuring method and an optical distance measuring device capable of co-calibration.

BACKGROUND

Optical distance measuring device may utilize 3D image sensing system to collect the distance/depth information related to a target. Through the distances/depths corresponding to the pixels of the 3D images, 3D image data is formed. 3D images are also called as distance images or depth images. The extra distance dimension may be applied in various applications, so as to obtain information between the camera and the object, to accomplish different tasks in the sensing area in the field.

In general, 3D image sensing system uses a light emitting diode (LED) to emit an incident light, and uses a plurality of pixel circuits within a pixel array to collect a reflected light corresponding to the incident light. The prior art has already developed a distance measuring method using a time of flight (ToF) of the incident light and the reflected light. Advantage of using a modulated light to perform ToF distance measurement is its good anti-interference capability against background light, but the ToF distance measuring method suffers from poor accuracy. The prior art has already developed a distance measuring method using a structured light and the triangulation method, which have good accuracy but poor anti-interference capability against background light. In addition, the distance measuring method using the triangulation method requires calibration on some parameters, and the ToF distance measuring method has a ToF error. When the parameters required by the triangulation method and the ToF error are unknown, the optical distance measuring device in the art is not able to provide the distance/depth information of the object.

Therefore, it is necessary to improve the prior art.

SUMMARY

It is therefore a primary objective of the present application to provide an optical distance measuring method and an optical distance measuring device, which is a fusion of the triangular method using the structured light and the ToF distance measuring method using the modulated light, to improve over disadvantages of the prior art.

To solve the problem stated in the above, an embodiment of the present application provides an optical distance measuring method applied in an optical distance measuring device. The optical distance measuring device comprises a light emitting module and a light sensing module. The light emitting module emits an incident light. The light sensing module receives a reflected light from an object reflecting point and generates an image. The method comprises confirming an expression of a first measured distance according to a plurality of first parameters; computing a time-of-flight (ToF) measured distance according to a time of flight of the incident light and the reflected light; computing optimized values of the plurality of first parameters and an optimized value of a ToF error corresponding to the ToF measured distance according to the expression of the first measured distance and the ToF measured distance; and obtaining a depth image information of the optical distance measuring device in relative to the object reflecting point according to the ToF measured distance, the optimized values of the plurality of first parameters and the optimized value of the ToF error; wherein the plurality of first parameters comprises a first angle, a second angle and a first distance between the light emitting module and the light sensing module; wherein the first angle is an elevation angle of the object reflecting point in relative to the light emitting module and the light sensing module, and the second angle is an Azimuth angle of the object reflecting point in relative to the light emitting module and the light sensing module.

Preferably, the step of confirming the expression of the first measured distance according to the plurality of first parameters comprises confirming a coordinates of the object reflecting point in relative to the light sensing module according to the plurality of first parameters; confirming an expression of a return distance of the object reflecting point in relative to the light sensing module and an expression of a departure distance of the object reflecting point in relative to the light emitting module according to the coordinates; and obtaining the expression of the first measured distance as a summation of the expression of the return distance and the expression of the departure distance.

Preferably, the step of computing the optimized values of the plurality of first parameters and the optimized value of the ToF error corresponding to the ToF measured distance according to the expression of the first measured distance and the ToF measured distance comprises formulating an objective function according to the expression of the first measured distance and the ToF measured distance; and computing the optimized values of the plurality of first parameters and the optimized value of the ToF error corresponding to the ToF measured distance according to the objective function.

Preferably, the objective function is an absolute value of the expression of the first measured distance minus the ToF measured distance and the ToF error.

Preferably, the step of computing the optimized values of the plurality of first parameters and the optimized value of the ToF error corresponding to the ToF measured distance according to the objective function comprises utilizing a Gaussian-Newton algorithm to compute the optimized values of the plurality of first parameters and the optimized value of the ToF error corresponding to the ToF measured distance according to the objective function.

Preferably, the incident light comprises a structured light, and the step of confirming the expression of the first measured distance according to the plurality of first parameters comprises confirming the expression of the first measured distance according to the reflected light corresponding to the structured light and the plurality of first parameters.

Preferably, the incident light comprises a modulated light, and the step of computing the ToF measured distance according to the time of flight of the incident light and the reflected light comprises computing the ToF measured distance according to the reflected light and the time of flight corresponding to the modulated light.

The present application further discloses an optical distance measuring device, comprising a light emitting module, configured to emit an incident light; alight sensing module, configured to receive a reflected light from an object reflecting point, and generate an image; and a computing module, coupled to the light sensing module. The computing module comprises a structured light submodule, configured to confirm an expression of a first measured distance according to a plurality of first parameters; a modulated light submodule, configured to computing a time-of-flight (ToF) measured distance according to a time of flight of the incident light and the reflected light; an optimization computing submodule, configured to compute optimized values of the plurality of first parameters and an optimized value of a ToF error corresponding to the ToF measured distance according to the expression of the first measured distance and the ToF measured distance; and an obtaining submodule, configured to obtaining a depth image information of the optical distance measuring device in relative to the object reflecting point according to the ToF measured distance, the optimized values of the plurality of first parameters and the optimized value of the ToF error; wherein the plurality of first parameters comprises a first angle, a second angle and a first distance between the light emitting module and the light sensing module; wherein the first angle is an elevation angle of the object reflecting point in relative to the light emitting module and the light sensing module, and the second angle is an Azimuth angle of the object reflecting point in relative to the light emitting module and the light sensing module.

The present application fuses the measured distance obtained by the triangulation method and the measured distance obtained by the ToF distance method, which uses the measured distance obtained by the ToF distance measuring method to calibrates the parameters required by the triangulation method, and uses the measured distance obtained by the triangulation method to calibrate the ToF error associated with the ToF distance measuring method, so as to solve the problem in the art.

These and other objectives of the present invention will no doubt become obvious to those of ordinary skill in the art after reading the following detailed description of the preferred embodiment that is illustrated in the various figures and drawings.

DETAILED DESCRIPTION

In order to make the objects, technical solutions and advantages of the present invention become more apparent, the following relies on the accompanying drawings and embodiments to describe the present invention in further detail. It should be understood that the specific embodiments described herein are only for explaining the present invention and are not intended to limit the present invention.

Figure 1:
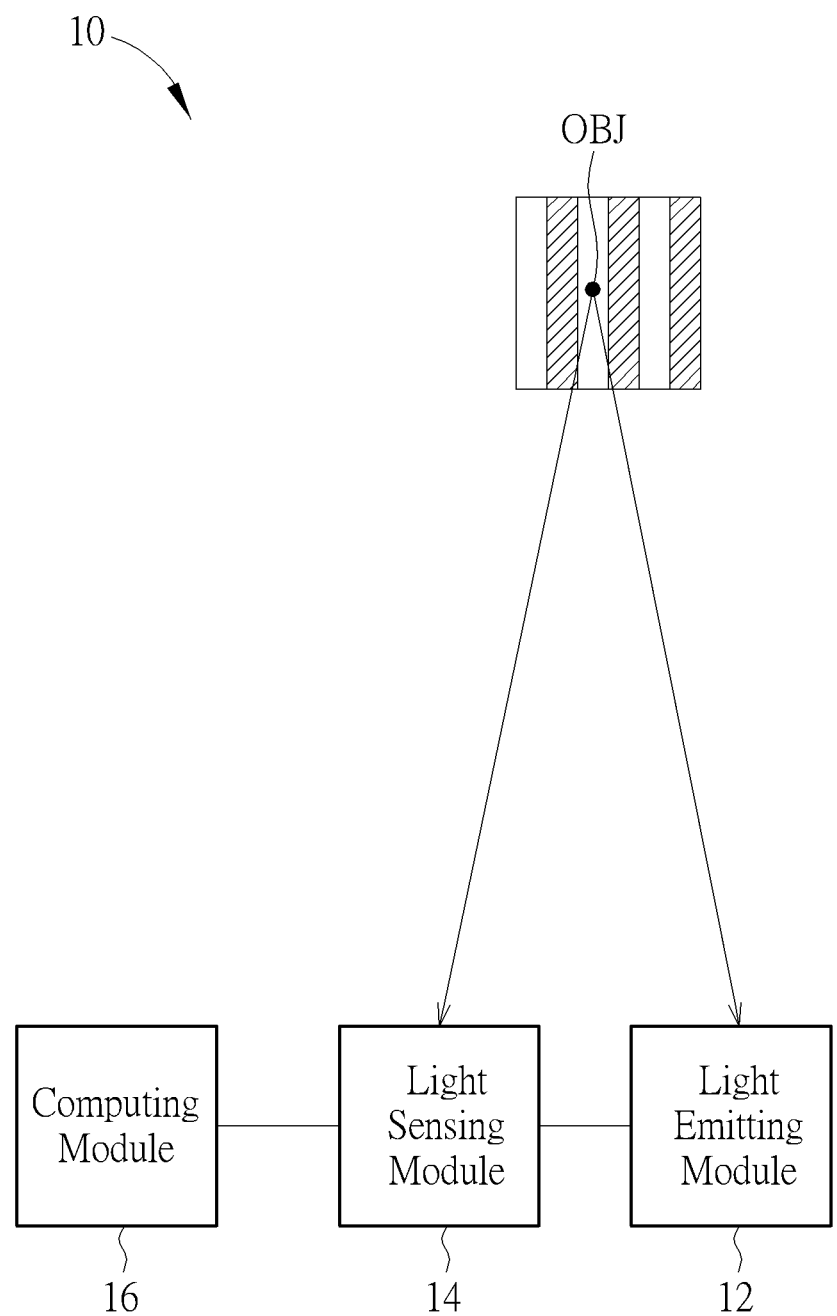
FIG. 1 is a schematic diagram of an optical distance measuring device according to an embodiment of the present application.

Please refer to FIG. 1. FIG. 1 is a schematic diagram of an optical distance measuring device 10 according to an embodiment of the present application. The optical distance measuring device 10 comprises a light emitting module 12, a light sensing module 14 and a computing module 16. The light emitting module 12 may comprise a light emitting diode (LED), configured to emit an incident light. The LED may be an infrared ray (IR) LED. The light sensing module 14 may be a camera unit, which may comprise a lens and an image sensor. The light sensing module 14 is configured to receive a reflected light from an object reflecting point OBJ and generate an image. The computing module 16 may comprise a structured light submodule, a modulated light submodule, an optimization computing submodule and an obtaining submodule. In an embodiment, the computing module 16 may comprise a processing unit and a storage unit. The processing unit may be an application process (AP) or a digital signal processor (DSP). The storage unit may store a program code, and the program code is configured to instruct the processing unit to execute a process, so as to compute a depth image information of the optical distance measuring device 10 in relative to the object reflecting point OBJ.

Furthermore, the incident light emitted by the light emitting module 12 is a modulated-and-structured light, which means that the incident light has properties of both the structured light and the modulated light. In other words, since the incident light has the property of the structured light, the incident light may have a strip-pattern distribution in bright-and-dark spatially; while since the incident light has the property of the modulated light, the incident light may have a brightness variation (in bright-and-dark) temporally according to a modulated signal inputted to the light emitting module 12. Other properties of the structured light and the modulated light are known by those skilled the art, which is not narrated herein for brevity.

In such a situation, the light sensing module 14 and the computing module 16 may compute a first measured distance D1 by using the property of the structured light and the triangulation method, and compute a time-of-flight (ToF) measured distance $D_{ToF}$ according to a time of flight of the incident light and the reflected light, by using the property of the modulated light. Nevertheless, in an idea situation, the computing module 16 has to know parameters α, ρ and b first when using the property of the structured light and the triangulation method, wherein a is an elevation angle of the object reflecting point OBJ in relative to the light emitting module 12 and the light sensing module 14, p is an Azimuth angle of the object reflecting point OBJ in relative to the light emitting module 12 and the light sensing module 14, and b is a distance between the light emitting module 12 and the light sensing module 14. In other words, the parameters α, ρ and b have to be known first, and then the computing module 16 is able to use the triangulation method to compute the first measured distance D1. That is, when the computing module 16 uses the property of the structured light and the triangulation method to compute the first measured distance D1, the parameters α, ρ and b are unknown to the computing module 16. In another perspective, the ToF measured distance $D_{ToF}$ computed by the computing module 16 using the ToF would have a ToF error $\Delta_{ToF}$, and the ToF error $\Delta_{ToF}$ is also known to the computing module 16. In short, the parameters α, ρ, b and the ToF error $\Delta_{ToF}$ would bring uncertainty to the computing module 16, such that neither the first measured distance D1 nor the ToF measured distance $D_{ToF}$ represents the depth image information of the optical distance measuring device 10 in relative to the object reflecting point OBJ accurately.

In the prior art, the computing module calibrates the parameters α, ρ and b under a condition that the distance between the optical distance measuring device and the object reflecting point is known. In other words, the user needs to put the object reflecting point at a known distance away from the optical distance measuring device, and then the computing module performs calibration on the parameters α, ρ and b, which means that the prior art causes inconvenience while in operation.

To solve the inaccuracy of the depth image information caused by the uncertainty of the parameters α, ρ, b and the ToF error $\Delta_{ToF}$, the present application mutually calibrates (co-calibrates) the measured distances derived from the triangulation method and the ToF distance measuring method. Specifically, the present application uses the ToF measured distance $D_{ToF}$ to calibrate the parameters α, ρ and b, which are required by the computing module 16 when using the triangulation method to compute the first measured distance D1, and uses the first measured distance D1 to calibrate the ToF error $\Delta_{ToF}$ of the ToF measured distance $D_{ToF}$.

Figure 2:
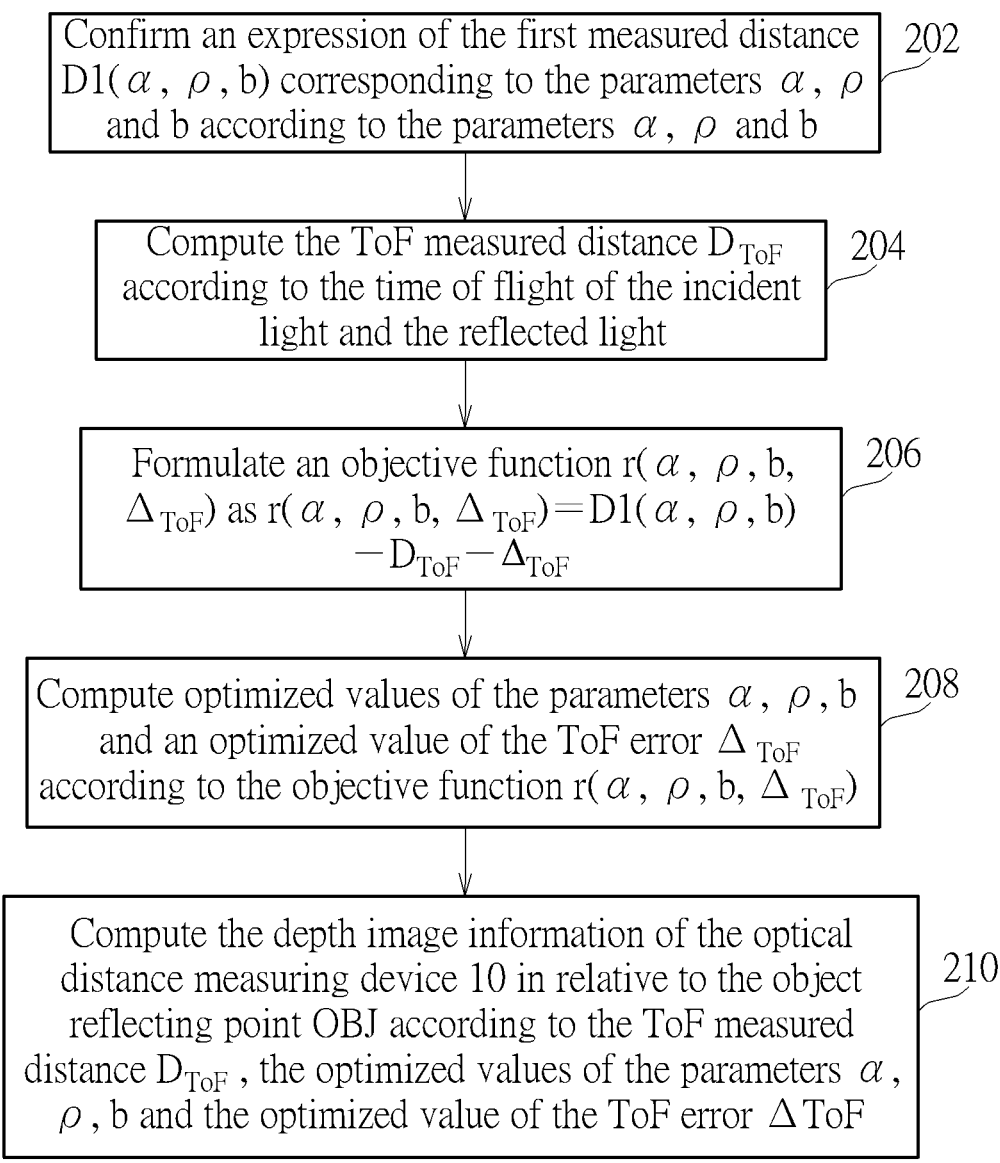
FIG. 2 is a schematic diagram of a process according to an embodiment of the present application.

Please refer to FIG. 2. FIG. 2 is a schematic diagram of a process 20 according to an embodiment of the present application. The process 20 may be compiled as the program code stored in the storage unit. The process 20 may be executed by the computing module 16. As shown in FIG. 2, the process 20 comprises the following steps:

Step 202: Confirm an expression of the first measured distance D1(α, ρ, b) corresponding to the parameters α, ρ and b according to the parameters α, ρ and b.

Step 204: Compute the ToF measured distance $D_{ToF}$ according to the time of flight of the incident light and the reflected light.

Step 206: Formulate an objective function r(α, ρ, b, $\Delta_{ToF}$) as r(α, ρ, b, $\Delta_{ToF}$)=D1(α, ρ, b)−$D_{ToF}$−$\Delta_{ToF}$.

Step 208: Compute optimized values of the parameters α, ρ, b and an optimized value of the ToF error $\Delta_{ToF}$ according to the objective function r(α, ρ, b, $\Delta_{ToF}$).

Step 210: Compute the depth image information of the optical distance measuring device 10 in relative to the object reflecting point OBJ according to the ToF measured distance $D_{ToF}$, the optimized values of the parameters α, ρ, b and the optimized value of the ToF error $\Delta_{ToF}$.

In Step 202, the structured light submodule of the computing module 16 confirms the expression of the first measured distance D1(α, ρ, b) corresponding to the parameters α, ρ and b according to the parameters α, ρ and b. In an embodiment, the computing module 16 may obtain an image coordinates ($x_0$, $y_0$) of the object reflecting point OBJ within the image first, and obtain a coordinates ($X_0$, $Y_0$, $Z_0$) of the object reflecting point OBJ in relative to the light sensing module 14 according to the image coordinates ($x_0$, $y_0$) and the parameters α, ρ and b. The computing module 16 may also confirm an expression of a departure distance of the object reflecting point OBJ in relative to the light emitting module 12 and an expression of a return distance of the object reflecting point OBJ in relative to the light sensing module 14 according to the coordinates ($X_0$, $Y_0$, $Z_0$). In addition, the expression of the first measured distance D1(α, ρ, b) is a summation of the departure distance and the return distance.

Specifically, the computing module 16 may confirm the coordinates ($X_0$, $Y_0$, $Z_0$) of the object reflecting point OBJ in relative to the light sensing module 14 as eq. 4, according to the image coordinates ($x_0$, $y_0$) and the parameters α, ρ and b. The computing module 16 may also confirm the departure distance as $\sqrt{X_0^2+(Y_0+b)^2+Z_0^2}$ and confirm the return distance as $\sqrt{X_0^2+Y_0^2+Z_0^2}$ according to the coordinates ($X_0$, $Y_0$, $Z_0$) from eq. 4. Accordingly, the computing module 16 may confirm the first measured distance D1(α, ρ, b) as $\sqrt{X_0^2+Y_0^2+Z_0^2}+\sqrt{X_0^2+(Y_0+b)^2+Z_0^2}$.

$$\begin{cases} X_0 = \dfrac{x_0 \cdot b \tan \alpha \cos \rho}{f - \tan \alpha(x \sin \rho + y \cos \rho)}, \\ Y_0 = \dfrac{y_0 \cdot b \tan \alpha \cos \rho}{f - \tan \alpha(x \sin \rho + y \cos \rho)}, \\ Z_0 = \dfrac{f \cdot b \tan \alpha \cos \rho}{f - \tan \alpha(x \sin \rho + y \cos \rho)} \end{cases} \quad (\text{eq. 4})$$

Figure 3:
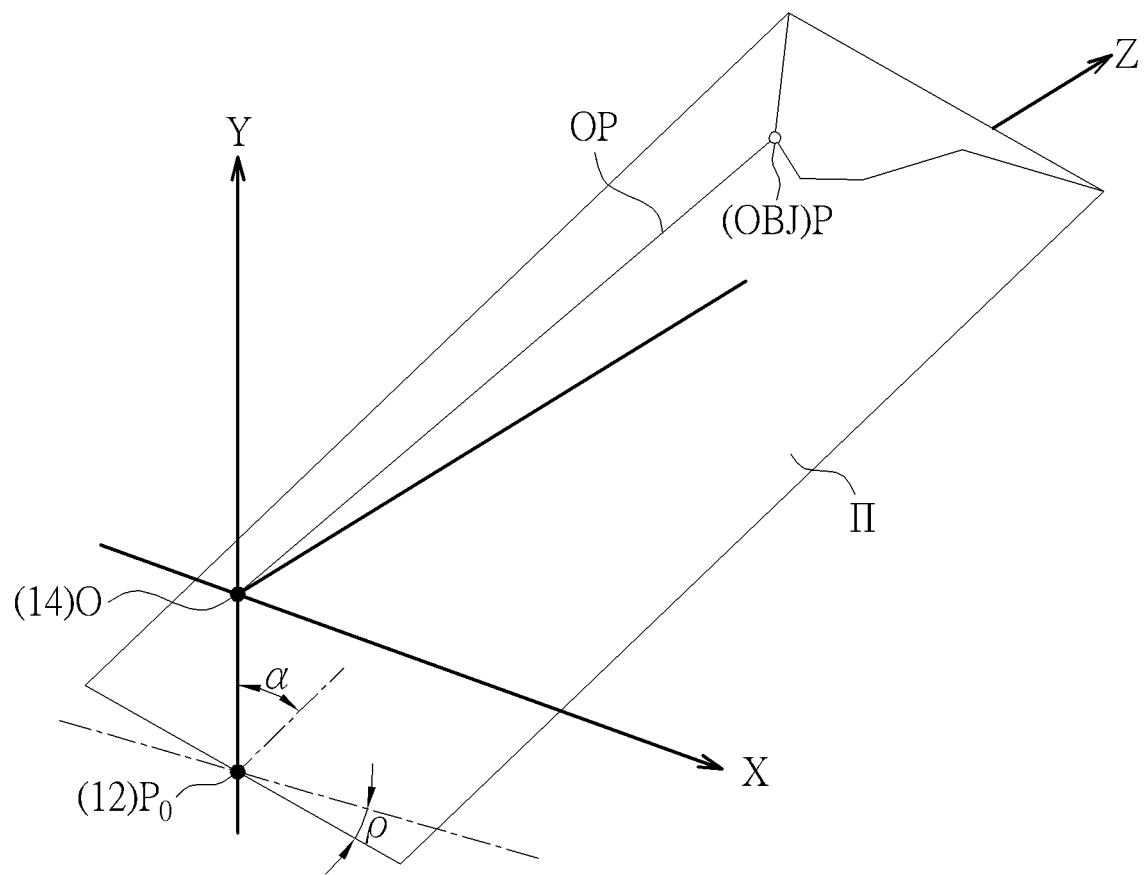
FIG. 3 is a schematic diagram of a three-dimensional coordinates.

Please refer to FIG. 3 to see the principles of eq. 4. FIG. 3 is a schematic diagram of a three-dimensional (3D) coordinates in which the object reflecting point OBJ, the light emitting module 12 and the light sensing module 14 locate. In FIG. 3, coordinates points O, P and $P_0$ represent the coordinates of the light sensing module 14, the object reflecting point OBJ and the light emitting module 12, respectively, in the 3D space. Suppose that the light sensing module 14 locates at the origin coordinates O (i.e., the coordinates of the light sensing module 14/coordinate point O is (0, 0, 0)), the coordinates of the object reflecting point OBJ/coordinate point P is ($X_0$, $Y_0$, $Z_0$), and the coordinates of the light emitting module 12/coordinate point $P_0$ is (0, −b, 0). Given that a focus length of the lens is f, a line OP formed between the coordinate point O and the coordinate point P is obtained according to the image coordinates ($x_0$, $y_0$), where every point X=(X, Y, Z) on the line OP may be expressed as eq. 1. In addition, in FIG. 3, the incident light forms a light plane Π. A normal vector n of the light plane Π may be expressed as eq. 2, which is related to the parameters α and ρ. Since the light plane Π is through the coordinate point $P_0$ and the normal vector is n, every point X=(X, Y, Z) on the light plane Π should all satisfy eq. 3 (or an equation of the light plane Π may be expressed as eq. 3). Since the coordinate point P($X_0$, $Y_0$, $Z_0$) locates both on the line OP and the light plane Π, ($X_0$, $Y_0$, $Z_0$) should satisfy both eq. 1 and eq. 3, and k can be solved as eq. 5. Finally, eq. 4 is obtained by substituting the k value of eq. 5 into eq. 1.

$$\frac{X}{x_0} = \frac{Z}{f} = \frac{Y}{y_0} = k \quad (\text{eq. 1})$$

$$n = \begin{bmatrix} \sin \alpha \sin \rho \\ \sin \alpha \cos \rho \\ -\cos \rho \end{bmatrix} \quad (\text{eq. 2})$$

$$n(X - P_0) = 0 \quad (\text{eq. 3})$$

$$k = \frac{b \tan \alpha \cos \rho}{f - \tan \alpha(x \sin \rho + y \cos \rho)} \quad (\text{eq. 5})$$

In addition, details of Step 204, regarding the modulated light submodule of the computing module 16 computing the ToF measured distance $D_{ToF}$ according to the time of flight of the incident light and the reflected light, are known by those skilled the art, which is not narrated herein for brevity.

In Step 206, the optimization computing submodule of the computing module 16 formulates the objective function $r(\alpha, \rho, b, \Delta_{ToF})$ as $r(\alpha, \rho, b, \Delta_{ToF}) = |\sqrt{X_0^2 + Y_0^2 + Z_0^2} + \sqrt{X_0^2 + (Y_0+b)^2 + Z_0^2} - D_{ToF} - \Delta_{ToF}|$. In Step 208, the optimization computing submodule of the computing module 16 computes the optimized values of the parameters $\alpha$, $\rho$, b and the optimized value of the ToF error $\Delta_{ToF}$ according to the objective function $r(\alpha, \rho, b, \Delta_{ToF})$. Specifically, the computing module 16 may use a recursive or an iterative algorithm to solve eq. 6 and obtain its solution. For example, the optimization computing submodule of the computing module 16 may uses Gauss-Newton algorithm, gradient-related algorithm, or golden search algorithm to obtain the solution of eq. 6, so as to obtain the optimized parameters $\alpha$, $\rho$, b and the optimized ToF error $\Delta_{ToF}$. The Gauss-Newton algorithm, the gradient-related algorithm and the golden search algorithm are known by those skilled the art, which are not narrated herein for brevity.

$$\max_{\alpha,\rho,b,\Delta_{DoF}} r(\alpha, \rho, b, \Delta_{ToF}) \qquad (\text{eq. 6})$$

Figure 4:
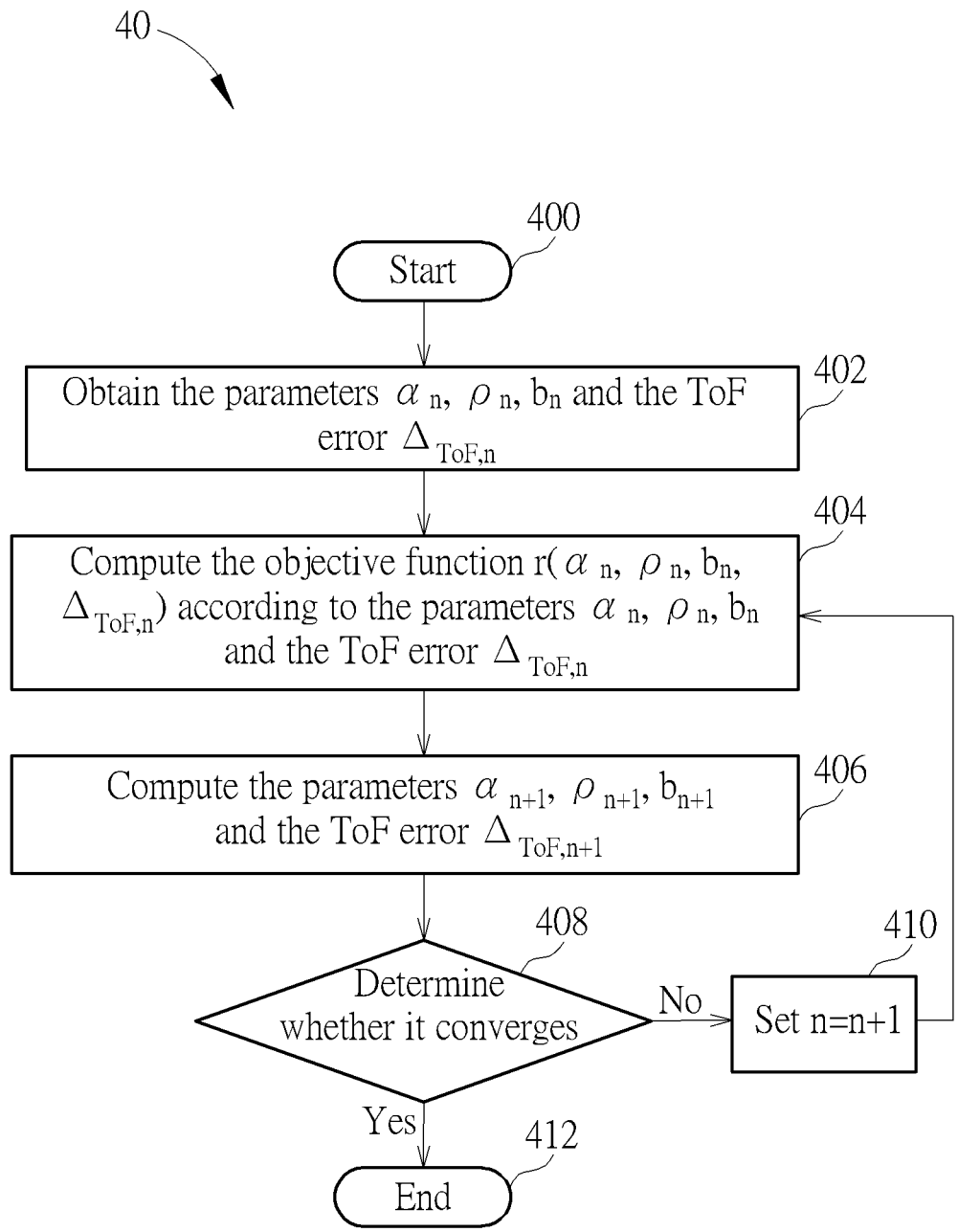
FIG. 4 is a schematic diagram of a process according to an embodiment of the present application.

The steps of the recursive/iterative algorithm are known by those skilled the art. As shown in FIG. 4, it comprises the following steps:

Step 400: Start.

Step 402: Obtain the parameters $\alpha_n$, $\rho_n$, $b_n$ and the ToF error $\Delta_{ToF,n}$.

Step 404: Compute the objective function $r(\alpha_n, \rho_n, b_n, \Delta_{ToF,n})$ according to the parameters $\alpha_n$, $\rho_n$, $b_n$ and the ToF error $\Delta_{ToF,n}$.

Step 406: Compute the parameters $\alpha_{n+1}$, $\rho_{n+1}$, $b_{n+1}$ and the ToF error $\Delta_{ToF,n+1}$.

Step 408: Determine whether it converges. If yes, go to Step 412; otherwise, go to Step 410.

Step 410: Set n=n+1.

Step 412: End.

In an idea situation, if the optimized parameters $\alpha$, $\rho$, b and the optimized ToF error $\Delta_{ToF}$ is substituted into $r(\alpha, \rho, b, \Delta_{ToF})$, it would be obtained that $r(\alpha, \rho, b, \Delta_{ToF})=0$, meaning that the measurement result obtained by using the structured light property with calibration, i.e., $\sqrt{X_0^2 + Y_0^2 + Z_0^2} + \sqrt{X_0^2 + (Y_0+b)^2 + Z_0^2}$ corresponding to the optimized parameters $\alpha$, $\rho$ and b, is the same as the ToF measured distance obtained by using the modulated light property according to the time of flight with calibration, i.e., $D_{ToF} + \Delta_{ToF}$ corresponding to the optimized ToF error $\Delta_{ToF}$.

Therefore, in Step 210, the obtaining submodule of the computing module 16 may obtain the depth image information of the optical distance measuring device 10 in relative to the object reflecting point OBJ according to the $\sqrt{X_0^2 + Y_0^2 + Z_0^2} + \sqrt{X_0^2 + (Y_0+b)^2 + Z_0^2}$ corresponding to the optimized parameters $\alpha$, $\rho$ and b, or the $D_{ToF} + \Delta_{ToF}$ corresponding to the optimized ToF error $\Delta_{ToF}$.

As can be seen, the computing module 16 formulates the objective function $r(\alpha, \rho, b, \Delta_{ToF})$ in Step 206, and obtains the optimized parameters $\alpha$, $\rho$ and b and the optimized ToF error $\Delta_{ToF}$ which achieve a minimum of the objective function $r(\alpha, \rho, b, \Delta_{ToF})$ in Step 208. Steps 206 and 208 are essentially equivalent to using the measured distance obtained by the ToF distance measuring method to calibrates the parameters $\alpha$, $\rho$ and b required by the triangulation method, and using the measured distance obtained by the triangulation method (the first measured distance D1) to calibrate the ToF error $\Delta_{ToF}$ associated with the ToF distance measuring method. In other words, the present application, utilizing Steps 206 and 208, may achieve an effect of co-calibrating the parameters $\alpha$, $\rho$ and b required by the triangulation method and the ToF error $\Delta_{ToF}$ of the ToF distance measuring method. Furthermore, the depth image information (of the optical distance measuring device 10 in relative to the object reflecting point OBJ obtained by the computing module 16 according to the "$\sqrt{X_0^2 + Y_0^2 \pm Z_0^2} + \sqrt{X_0^2 + (Y_0+b)^2 + Z_0^2}$" corresponding to the optimized parameters $\alpha$, $\rho$, b and the "$D_{ToF} + \Delta_{ToF}$" corresponding to the optimized ToF error $\Delta_{ToF}$) may be regarded as a fusion of the measured distance obtained by the triangulation method and the measured distance obtained by the ToF distance method, which have advantages of the accuracy, brought by the structured light property and the triangulation method, and the anti-interference capability against the background light, brought by the modulated light property and the ToF distance measuring method.

In summary, the present application uses the measured distance obtained by the ToF distance measuring method to calibrate the parameters required by the triangulation method, and uses the measured distance obtained by the triangulation method to calibrate the ToF error associated with the ToF distance measuring method. The present application is equivalent to fusing the measured distance obtained by the triangulation method and the measured distance obtained by the ToF distance method, and has the advantages of the accuracy, brought by the structured light property and the triangulation method, and the anti-interference capability against the background light, brought by the modulated light property and the ToF distance measuring method.

The foregoing is only embodiments of the present application, which is not intended to limit the present application. Any modification following the spirit and principle of the present application, equivalent substitutions, improvements should be included within the scope of the present invention.

What is claimed is:

1. An optical distance measuring method, applied in an optical distance measuring device, wherein the optical distance measuring device comprises a light emitting module and a light sensing module, the light emitting module emits an incident light, the light sensing module receives a reflected light from an object reflecting point and generates an image, characterized in that, the method comprises:

confirming an expression of a first measured distance computed by using a property of a structured light and a triangulation method according to a plurality of first parameters;

computing a time-of-flight (ToF) measured distance by using a property of a modulated light according to a time of flight of the incident light and the reflected light;

computing optimized values of the plurality of first parameters and an optimized value of a ToF error corresponding to the ToF measured distance according to a co-calibration between the expression of the first measured distance and the ToF measured distance; and obtaining depth image information of the optical distance measuring device relative to the object reflecting point via optical distance measuring according to the ToF measured distance, the optimized values of the plurality of first parameters and the optimized value of the ToF error;

wherein the plurality of first parameters comprises a first angle, a second angle and a first distance between the light emitting module and the light sensing module;

wherein the first angle is an elevation angle of the object reflecting point relative to the light emitting module and the light sensing module, and the second angle is an azimuth angle of the object reflecting point relative to the light emitting module and the light sensing module;

wherein the incident light has the property of the structured light and the property of the modulated light.

2. The optical distance measuring method of claim 1, characterized in that, the step of confirming the expression of the first measured distance according to the plurality of first parameters comprises:

confirming coordinates of the object reflecting point relative to the light sensing module according to the plurality of first parameters;

confirming an expression of a return distance of the object reflecting point relative to the light sensing module and an expression of a departure distance of the object reflecting point relative to the light emitting module according to the coordinates; and obtaining the expression of the first measured distance as a summation of the expression of the return distance and the expression of the departure distance.

3. The optical distance measuring method of claim 1, characterized in that, the step of computing the optimized values of the plurality of first parameters and the optimized value of the ToF error corresponding to the ToF measured distance according to the expression of the first measured distance and the ToF measured distance comprises:

formulating an objective function according to the expression of the first measured distance and the ToF measured distance; and computing the optimized values of the plurality of first parameters and the optimized value of the ToF error corresponding to the ToF measured distance according to the objective function.

4. The optical distance measuring method of claim 3, characterized in that, the objective function is an absolute value of the expression of the first measured distance minus the ToF measured distance and the ToF error.

5. The optical distance measuring method of claim 3, characterized in that, the step of computing the optimized values of the plurality of first parameters and the optimized value of the ToF error corresponding to the ToF measured distance according to the objective function comprises:

utilizing a Gaussian-Newton algorithm to compute the optimized values of the plurality of first parameters and the optimized value of the ToF error corresponding to the ToF measured distance according to the objective function.

6. The optical distance measuring method of claim 1, characterized in that, the incident light comprises a structured light, and the step of confirming the expression of the first measured distance according to the plurality of first parameters comprises:

confirming the expression of the first measured distance according to the reflected light corresponding to the structured light and the plurality of first parameters.

7. The optical distance measuring method of claim 1, characterized in that, the incident light comprises a modulated light, and the step of computing the ToF measured distance according to the time of flight of the incident light and the reflected light comprises:

computing the ToF measured distance according to the reflected light and the time of flight corresponding to the modulated light.

8. An optical distance measuring device, comprising:

a light emitting module, configured to emit an incident light;

a light sensing module, configured to receive a reflected light from an object reflecting point, and generate an image; and a computing module, coupled to the light sensing module, the computing module comprising:

a structured light submodule, configured to confirm an expression of a first measured distance computed by using a property of a structured light and a triangulation method according to a plurality of first parameters;

a modulated light submodule, configured to computing a time-of-flight (ToF) measured distance by using a property of a modulated light according to a time of flight of the incident light and the reflected light;

an optimization computing submodule, configured to compute optimized values of the plurality of first parameters and an optimized value of a ToF error corresponding to the ToF measured distance according to a co-calibration between the expression of the first measured distance and the ToF measured distance; and an obtaining submodule, configured to obtaining depth image information of the optical distance measuring device relative to the object reflecting point via optical distance measuring according to the ToF measured distance, the optimized values of the plurality of first parameters and the optimized value of the ToF error;

wherein the plurality of first parameters comprises a first angle, a second angle and a first distance between the light emitting module and the light sensing module;

wherein the first angle is an elevation angle of the object reflecting point relative to the light emitting module and the light sensing module, and the second angle is an azimuth angle of the object reflecting point relative to the light emitting module and the light sensing module;

wherein the incident light has the property of the structured light and the property of the modulated light.

9. The optical distance measuring device of claim 8, characterized in that, the structured light submodule is configured to execute the following steps:

confirming coordinates of the object reflecting point relative to the light sensing module according to the plurality of first parameters;

confirming an expression of a return distance of the object reflecting point relative to the light sensing module and an expression of a departure distance of the object reflecting point relative to the light emitting module according to the coordinates; and obtaining the expression of the first measured distance as a summation of the expression of the return distance and the expression of the departure distance.

10. The optical distance measuring device of claim 8, characterized in that, the optimization computing submodule is configured to execute the following steps:

formulating an objective function according to the expression of the first measured distance and the ToF measured distance; and computing the optimized values of the plurality of first parameters and the optimized value of the ToF error corresponding to the ToF measured distance according to the objective function.

11. The optical distance measuring device of claim 10, characterized in that, the objective function is an absolute value of the expression of the first measured distance minus the ToF measured distance and the ToF error.

12. The optical distance measuring device of claim 10, characterized in that, the optimization computing submodule is configured to execute the following step:
   utilizing a Gaussian-Newton algorithm to compute the optimized values of the plurality of first parameters and the optimized value of the ToF error corresponding to the ToF measured distance according to the objective function.

13. The optical distance measuring device of claim 8, characterized in that, the incident light comprises a structured light, the structured light submodule is configured to execute the following step:
   confirming the expression of the first measured distance according to the reflected light corresponding to the structured light and the plurality of first parameters.

14. The optical distance measuring device of claim 8, characterized in that, the incident light comprises a modulated light, the modulated light submodule is configured to execute the following step:
   computing the ToF measured distance according to the reflected light and the time of flight corresponding to the modulated light.

* * * * *